US006829405B1

(12) United States Patent
Wachsman et al.

(10) Patent No.: US 6,829,405 B1
(45) Date of Patent: Dec. 7, 2004

(54) RECONFIGURABLE OPTICAL ADD-DROP MULTIPLEXER

(75) Inventors: John M. Wachsman, Dublin, CA (US); Jeffrey D. Walker, El Cerrito, CA (US)

(73) Assignee: Finisar Corporation, Sunnyvale, CA (US)

( * ) Notice: Subject to any disclaimer, the term of this patent is extended or adjusted under 35 U.S.C. 154(b) by 32 days.

(21) Appl. No.: 10/095,539

(22) Filed: Mar. 11, 2002

Related U.S. Application Data

(60) Provisional application No. 60/274,420, filed on Mar. 9, 2001.

(51) Int. Cl.$^7$ .............................. G02B 6/28; G02B 6/35
(52) U.S. Cl. ......................................... 385/24; 385/17
(58) Field of Search ...................... 385/24, 17; 398/48, 398/50; 372/96; 359/344, 346

(56) References Cited

U.S. PATENT DOCUMENTS

| | | | |
|---|---|---|---|
| 3,467,906 A | | 9/1969 | Cornely et al. |
| 3,828,231 A | | 8/1974 | Yamamoto |
| 4,794,346 A | | 12/1988 | Miller |
| 5,283,844 A | * | 2/1994 | Rice et al. ..................... 385/17 |
| 5,299,054 A | | 3/1994 | Geiger ....................... 359/251 |
| 5,305,412 A | | 4/1994 | Paoli .......................... 385/122 |
| 5,436,759 A | | 7/1995 | Dijaili et al. ............... 359/333 |
| 5,528,710 A | * | 6/1996 | Burton et al. ................. 385/16 |
| 5,550,818 A | * | 8/1996 | Brackett et al. ........ 370/395.51 |
| 5,771,320 A | | 6/1998 | Stone ........................... 385/16 |
| 5,959,749 A | * | 9/1999 | Danagher et al. ............. 398/83 |
| 5,970,201 A | * | 10/1999 | Anthony et al. ............. 385/140 |
| 5,999,293 A | | 12/1999 | Manning ..................... 359/139 |
| 6,061,156 A | | 5/2000 | Takeshita et al. ........... 359/117 |
| 6,115,517 A | | 9/2000 | Shiragaki et al. ............. 385/24 |
| 6,128,115 A | | 10/2000 | Shiragaki .................... 359/128 |
| 6,317,531 B1 | | 11/2001 | Chen et al. ................... 385/17 |
| 6,333,799 B1 | | 12/2001 | Bala et al. ................... 359/128 |
| 6,335,992 B1 | | 1/2002 | Bala et al. ..................... 385/17 |
| 6,344,912 B1 | * | 2/2002 | Hajjar et al. ................. 398/48 |
| 6,515,777 B1 | * | 2/2003 | Arnold et al. ................ 398/97 |
| 6,735,394 B1 | * | 5/2004 | Yue et al. ..................... 398/92 |
| 2004/0056243 A1 | * | 3/2004 | Atanackovic et al. ......... 257/19 |

FOREIGN PATENT DOCUMENTS

JP        56006492        1/1981        ............. H01S/3/18

OTHER PUBLICATIONS

G. Sherlock et al. Integrated 2×2 optical switch with gain. Electronics Letters, vol. 30 No. 2, pp. 137–138. Jan. 1994.*
Alcatel, "Alcatel Optronics Introduces a Gain–Clamped Semiconductor Optical Amplifier," *Press Release for Immediate Publication*, OFC '98, San Jose, i unnumbered page, (Feb. 1998).
Diez, S., Ludwig, R., and Weber, H.G., "All–Optical Switch for TDM and WDM/TDM Systems Demonstrated in a 640 Gbit/s Demultiplexing Experiment," Electronics Letters, vol. 34, No. 8, pp. 803–805, Apr. 16, 1988.
Diez, S., Ludwig, R., and Weber, H.G., Gain–Transparent SOA–Switch for High–Bitrate OTDM Add/Drop Multiplexing, IEEE Photonics Technology Letters, vol. 11, No. 1, pp. 60–62, Jan. 1999.
Diez, S., Ludwig, R., Patzak, E., and Weber, H.G., "Novel Gain–Transparent SOA–Switch for High Bitrate OTDM Add/Drop Multiplexing," ECOC'98, vol. 1, pp. 461–462, Sep. 1998.

(List continued on next page.)

*Primary Examiner*—Rodney Bovernick
*Assistant Examiner*—Mike Stahl
(74) *Attorney, Agent, or Firm*—Workman Nydegger

(57) ABSTRACT

An optical add drop multiplexer (OADM) comprised of a plurality of lasing semiconductor optical amplifiers for performing the switching of optical signals from various inputs to outputs in the switching fabric of the OADM.

27 Claims, 14 Drawing Sheets

OTHER PUBLICATIONS

Dorgeuille, F., Noirie, L., Faure, J-P., Ambrosy, A., Rabaron, S., Boubal, F., Schilling, M., and Artigue, C., "1.28 Tbit/s Throughput 8×8 Optical Switch Based on Arrays of Gain–Clamped Semiconductor Optical Amplifier Gates," Optical Fiber Communication Confernece, vol. 4, pp. 221–223, Mar. 2000.

Dorgeuille, F., Lavigne, B., Emery, J.Y., Di Maggio, M., Le Bris, J., Chiaroni, D., Renaud, M., Baucknecht, R., Schneibel, H.P., Graf, C., and Melchior, H., "Fast Optical Amplifier Gate Array for WDM Routing and Switching Applications," OFC '98 Technical Digest, pp. 42–44, 1998.

Doussiere, P., Jourdan, A., Soulage, G., Garabédian, P., Graver, C., Fillion, T., Derouin, E., and Leclerc, D., "Clamped Gain Travelling Wave Semiconductor Optical Amplifier for Wavelength Division Multiplexing Application," IEEE, US, vol. Conf. 14, pp. 185–186, New York, Sep. 14, 1994.

Evankow, Jr., J.D., and Thompson, R. A., "Photonic Switching Modules Designed with Laser Diode Amplifiers," IEEE, Journal on Selected Areas in Communications, vol. 6, No. 7, pp. 1087–1095, Aug. 1988.

Fernier, B., Brosson, P., Bayart, D., Doussiére, P., Beaumont, R., Leblond, F., Morin, P., Da Loura, G., Jacquet, J., Derouin, E., and Garabedian, P., "Fast (300 ps) Polarization Insensitive Semiconductor Optical Amplifier Switch with Low Driving Current (70 mA)," Semiconductor Laser Conference, Conference Digest, 13th IEEE International, pp. 130–131, Sep. 21–25, 1992.

Fouquet, J.E., Venkatesh, S., Troll, M., Chen, D., Schiaffino, S., and Barth, P.W., "Compact, Scalable Fiber Optic Cross–Connect Switches," IEEE, 1999 Digest of the LEOS Summer Topical Meetings, pp. 59–60, 1999.

Ibrahim, M.M., "Photonic Switch Using Surface–Emitting Laser Diode and APD," 16th National Radio Science Conference, NRSC'99, pp. 18, Ain Shams University, Cairo, Egypt, Feb. 23–25, 1999.

Jeong, G., and Goodman, J.W., "Gain Optimization in Switches Based on Semiconductor Optical Amplifiers," Journal of Lightwave Technology, Vo. 13, No. 4, pp. 598–605, Apr. 1995.

Kitamura, S., Hatakeyama, H., and Hamamoto, K., "Spot–Size Converter Integrated Semiconductor Optical Amplifiers for Optical Gate Applications," IEEE Journal of Quantum Electronics, vol. 35, No. 7, pp. 1067–1074, Jul. 1999.

Leuthold, J., Besse, P.A., Eckner, J., Gamper, E., Dülk, M., and Melchior, H., "All–Optical Space Switches with Gain and Principally Ideal Extinction Ratios," IEEE Journal of Quantum Electronics, vol. 34, No. 4, pp. 622–633, Apr. 1998.

McAdams, L.R., Weverka, R.T., and Cloonan, J., "Linearizing High Performance Semiconductor Optical Amplifiers: Techniques and Performance," LEOS Presentation, pp. 363–364, 1996.

Mørk, J., and Mecozzi, A., "Semiconductor Devices for All–Optical Signal Processing: Just How Fast can They Go?," IEEE Lasers and Electro–Optics Society 1999 12th Annual Meeting, LEOS'99, vol. 2, pp. 900–901, Nov. 8–11, 1999.

Mutalik, V.G., van den Hoven, G., and Tiemeijer, L., "Analog Performance of 1310–nm Gain–Clamped Semiconductor Optical Amplifiers," OFC '09 Technical Digest, pp. 266–267, 1997.

Panajotov, K., Ryvkin, B., Peeters, M., Verschaffelt, G., Danckaert, J., Thienpont, H., Veretennicoff, I., "Polarisation Switching in Proton–Implanted VCSELs," 1999 Digest of the LEOS Summer Topical Meetings, pp. 55–56, Jul. 26–30, 1999.

Qiu, B.C., Ke, M.L., Kowalski, O.P., Bryce, A.C., Aitchison, J.S., Marsh, J.H., Owen, M., White, I.H., and Penty, R.V., "Monolithically Integrated Fabrication of 2×2 and 4×4 Crosspoint Switches Using Quantum Well Intermixing," 2000 International Conference on Indium Phosphide and Related Materials, Conference Proceedings, pp. 415–418, May 14–18, 2000.

Scheuer, J., Arbel, D., and Orenstein, M., "Nonlinear On–Switching of High Spatial Frequency Patterns in Ring Vertical Cavity Surface Emitting lasers," 1999 IEEE LEOS Annual Meeting Conference Proceedings, 12th Annual Meeting, IEEE Lasers and Electro–Optics Society 1999 Annual Meeting, vol. 1, pp. 123–124, Nov. 8–9, 1999.

Soto, H., Erasme, D., and Guekos, G., "All–Optical Switch Demonstration Using a Birefringence Effect in a Semiconductor Optical Amplifier," IEEE CLEO, Pacific Rim '99, pp. 888–889, 1999.

Soulage, G., Doussière, P., Jourdan, A., and Sotom, M., "Clamped Gain Travelling Wave Semiconductor Optical Ampifier as a Large Dynamic Range Optical Gate," Alcatel Alsthom Recherche, route de Nozay, 91460 Marcoussis (France), 4 unnumbered pages, undated.

Tai, C., and Way, W.I., "Dynamic Range and Switching Speed Limitations of an N×N Optical Packet Switch Based on Low–Gain Semiconductor Optical Amplifiers," IEEE Journal of Lightwave Technology, vol. 14, No. 4, pp. 525–533, Apr. 4, 1996.

Tiemeijer, L.F., Walczyk, S., Verboven, A.J.M., van den Hoven, G.N., Thijs, P.J.A., van Dongen, T., Binsma, J.J.M., and Jansen, E.J., "High–Gain 1310 nm Semiconductor Optical Amplifier Modules with a Built–in Amplified Signal Monitor for Optical Gain control," IEEE Photonics Technology Letters, vol. 9, No. 3, pp. 309–311, Mar. 1997.

Toptchiyski, G., Kindt, S., and Petermann, K., "Time–Domain Modeling of Semiconductor Optical Amplifiers for OTDM Applications," IEEE Journal of Lightwave Technology, vol. 17, No.12, pp. 2577–2583, Dec. 1999.

Tiemeijer, L.F., Thijs, P.J.A., Dongen, T.v., Binsma, J.J.M., Jansen, E.J., van Helleputte, H.R.J.R., "Reduced Intermodulation Distortion in 1300 nm Gain–Clamped MQW Laser Amplifiers," IEEE Photonics Technology Letters, vol. 7, No. 3, pp. 284–286, Mar. 1995.

van Roijen, R., van der Heijden, M.M., Tiemeijer, L.F., Thijs, P.J.A., van Dongen, T., Binsma, J.J.M., and Verbeek, B.H., "Over 15 dB Gain from a Monolithically Integrated Optical Switch with an Amplifier," IEEE Photonics Technolgy Letters, vol. 5, No. 5, pp. 529–531, May 1993.

Yoshimoto, N., Magari, K., Ito, T., Kawaguchi, Y., Kishi, K., Kondo, Y., Kadota, Y., Mitomi, O., Yoshikuni, Y., Hasumi, Y., Tohmori, Y., and Nakajima O., "Spot–Size Converted Polarization–Insensitive SOA Gate with a Vertical Tapered Submicrometer Stripe Structure," IEEE Photonics Technolgy Letters, vol. 10, No. 4, pp. 510–512, Apr. 4, 1998.

* cited by examiner

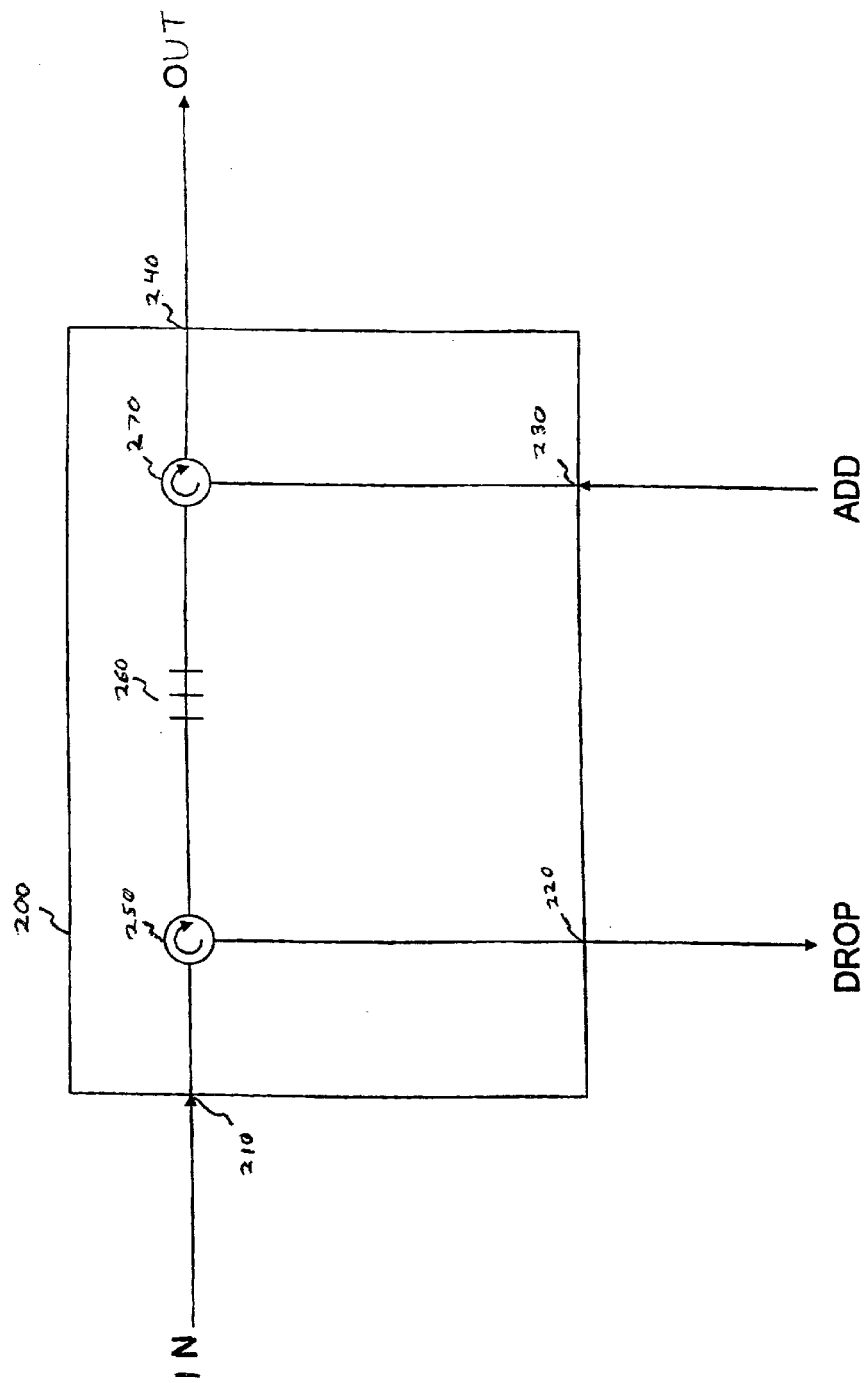

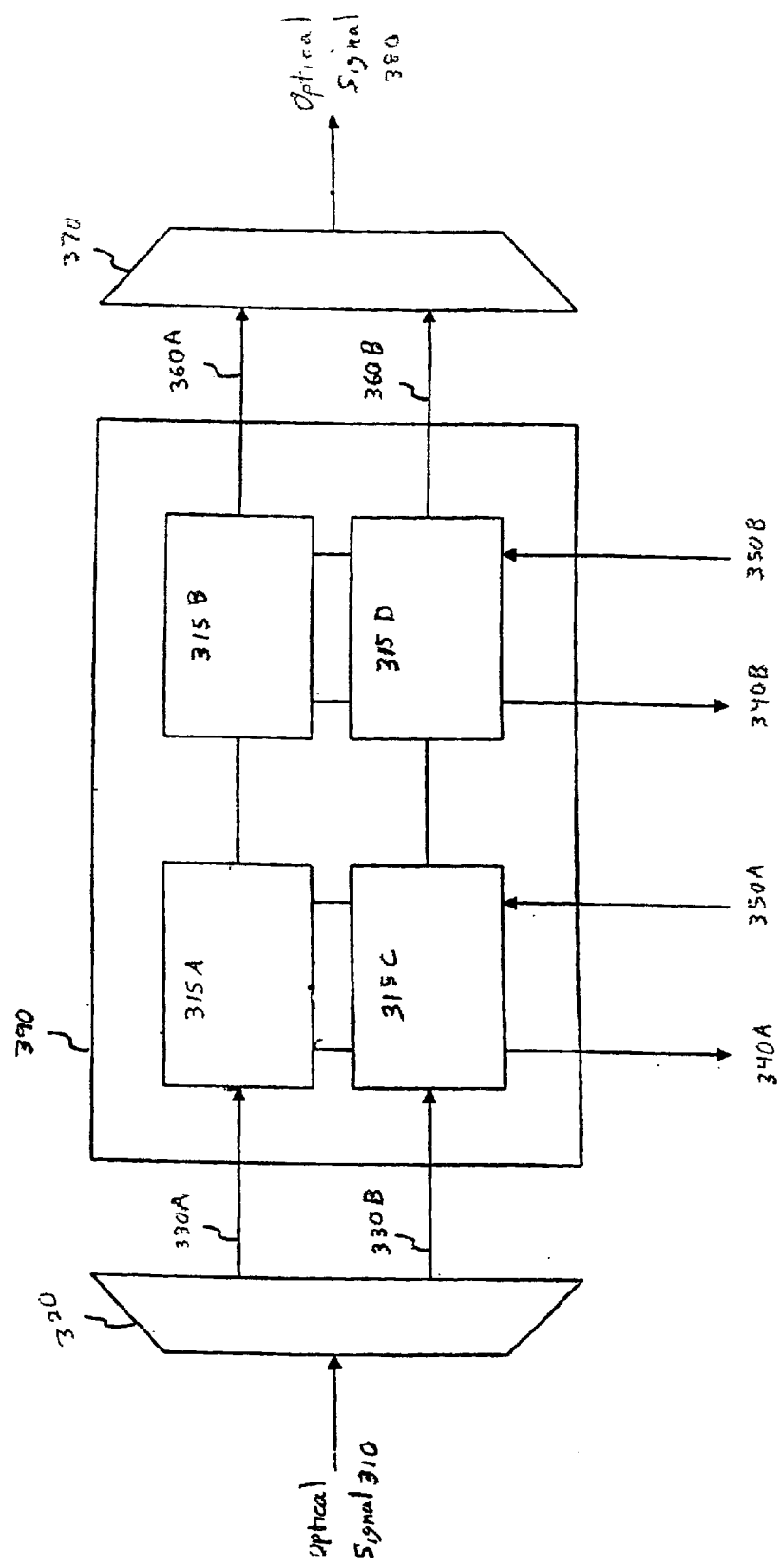

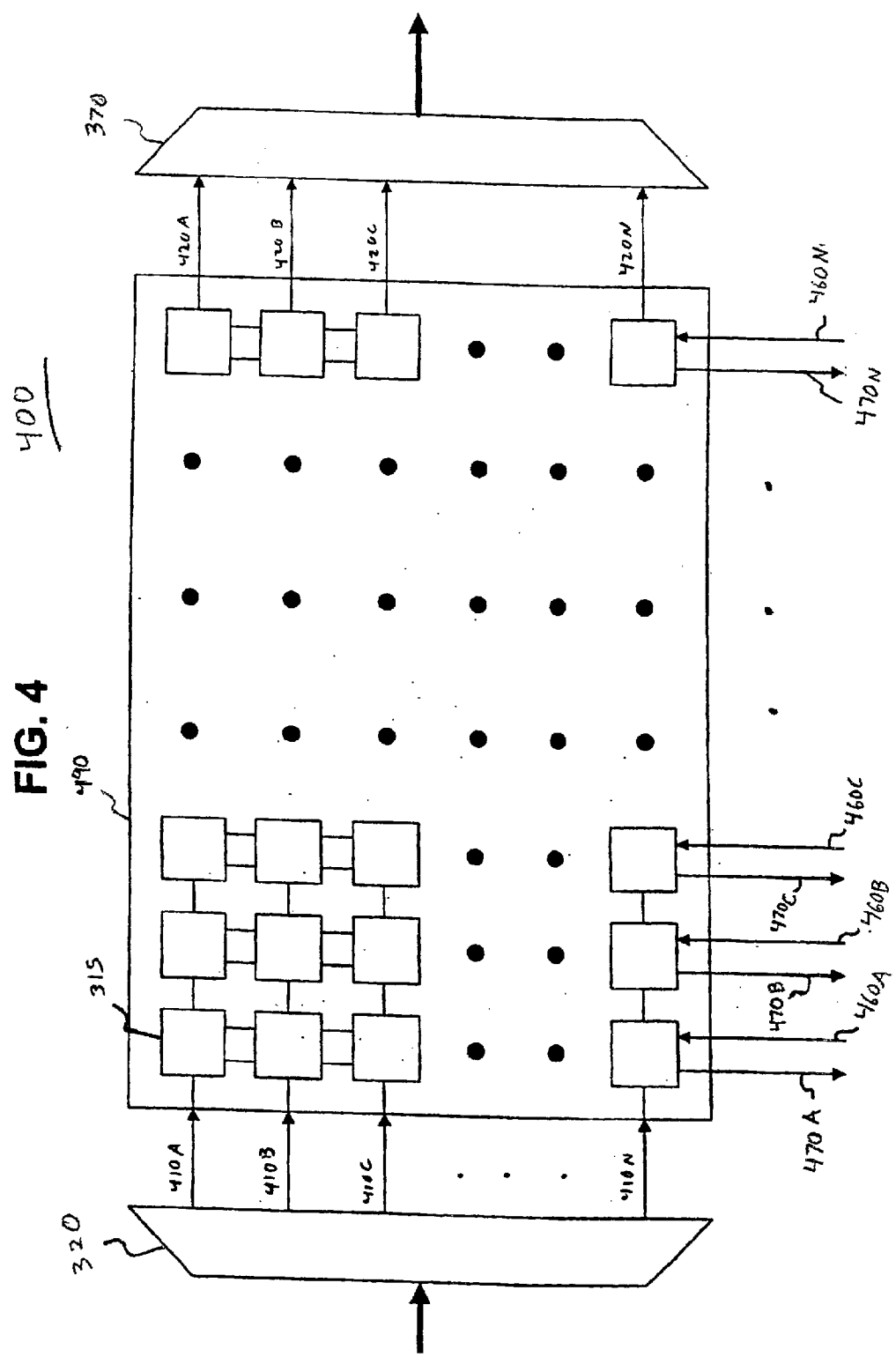

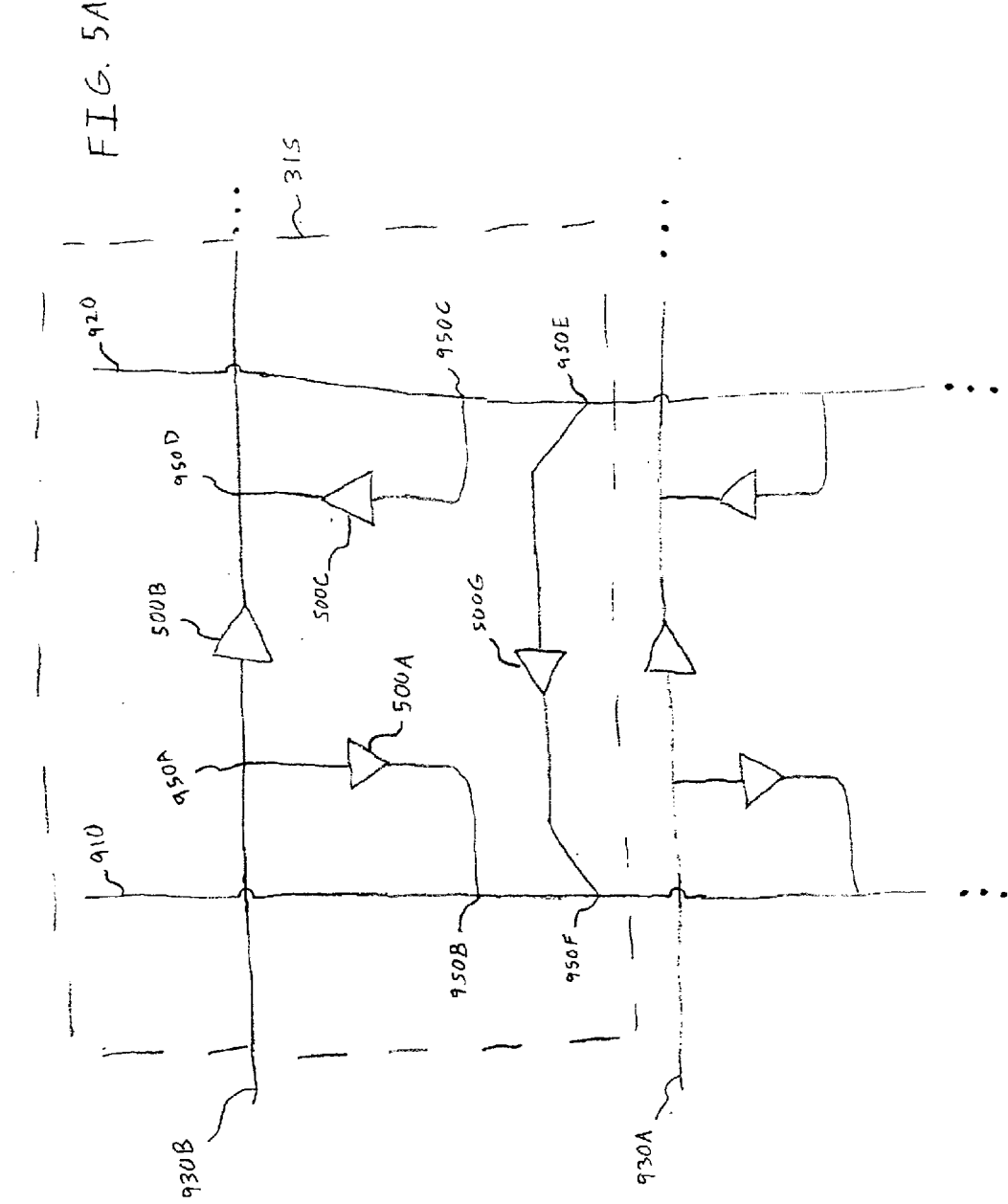

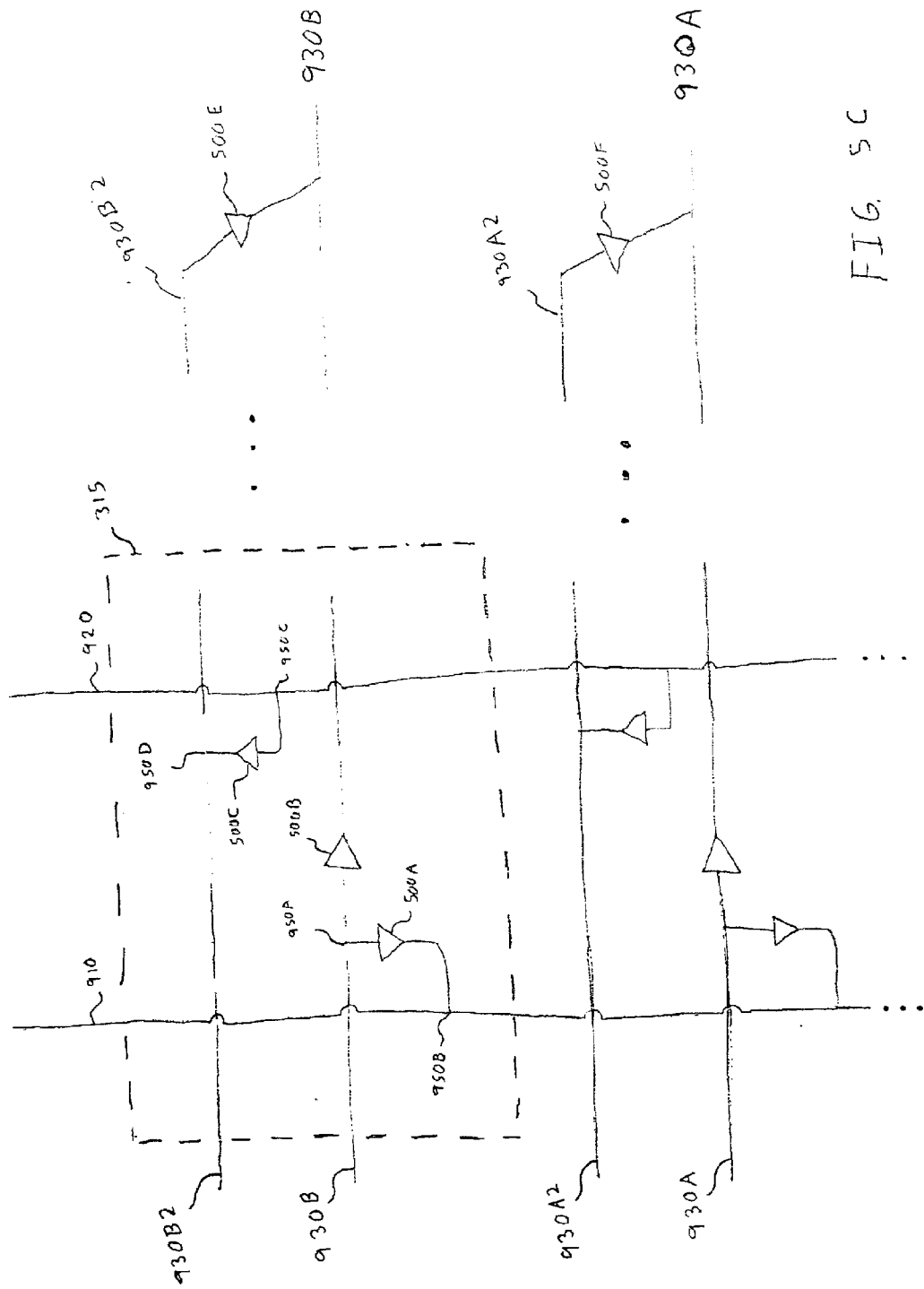

RECONFIGURABLE OPTICAL ADD-DROP MULTIPLEXER

CROSS-REFERENCE TO RELATED APPLICATIONS

This application claims priority under 35 U.S.C. § 119(e) to U.S. Provisional Patent application Ser. No. 60/274,420, "Reconfigurable Optical Add-Drop Multiplexer," by Jeffrey D. Walker and John M. Wachsman, filed Mar. 9, 2001.

BACKGROUND OF THE INVENTION

1. Field of the Invention

This invention relates generally to semiconductor optical amplifiers. More particularly, it relates to lasing semiconductor optical amplifiers used in combination with other optical elements to create a reconfigurable optical add drop multiplexer (OADM).

2. Description of Related Technologies

Fiber optic communications systems transmit information optically at high speeds over optical fibers. A typical communications system includes a transmitter, an optical fiber, and a receiver. The transmitter incorporates information to be communicated into an optical signal and transmits the optical signal via the optical fiber to the receiver. The receiver recovers the original information from the received optical signal. These systems are well adapted to transmit information at high speeds from one location to another.

However, efficient point-to-point transmission alone is not sufficient to construct a practical network. For example, a fiber running from New York to San Francisco may be efficient for transporting traffic from New York to San Francisco, but does not help much in transporting to/from Chicago, for example. To add Chicago to the New York—San Francisco route, traffic must be able to be added or dropped from the stream between New York and San Francisco.

An add-drop multiplexer (ADM) is the device which accomplishes this function. Many current ADMs are optical-electrical-optical, meaning that an incoming optical signal is converted to electrical form, the add-drop functionality is implemented electrically, and the resulting signals are then converted back to optical form. The two optical-electrical conversions add extra complexity and, strictly speaking, are unnecessary since the input and output signals are both optical.

Hence, ADMs which are entirely optical (in the sense that the signal remains in optical form while traveling through the ADM) are desirable. For example, in a wavelength division multiplexed (WDM) system, an optical add drop multiplexer (OADM) might work in the following manner. An optical signal carrying a wavelength division multiplexed (WDM) optical signal is input into a wavelength division multiplexer that demultiplexes the WDM optical signal into N single wavelength signals. The OADM is configured with N inputs, N outputs, N add inputs and N drop outputs. Each of the N single wavelength signals is coupled to an input to the OADM. As the N optical signals propagate through the OADM, each channel (i.e., each wavelength) can be dropped, added or passed through the OADM as needed. Dropping a channel means that channel is redirected by the OADM to the drop outputs. Conversely, adding a channel means that channel is received at one of the N add inputs and the OADM directs it to one of the OADM output ports. A pass through occurs when a channel is directed by the OADM from one input to an output. The N optical signals at the outputs of the OADM are wavelength division multiplexed back together into a single WDM optical signal. This signal is then forwarded out over the optical communications system.

OADMs may be either fixed or reconfigurable. In a fixed OADM, one or more of the channels are always dropped and/or added in the OADM. Thus, the path traveled by the particular optical signal is fixed based on which channel it occupies. In a reconfigurable OADM, switching elements inside the OADM allow each input signal to be dynamically added, dropped or passed through the OADM. Reconfigurable OADMs are preferred due to their increased functionality and flexibility in changing the topology of a network.

FIG. 1 is an illustration of a fixed OADM 100. A fixed OADM is configured such that N wavelength division multiplexed (WDM) channels are input into OADM 100 and M channels are dropped and added while the remaining N–M channels pass through OADM 100. In this implementation, a single WDM optical signal containing four optical channels enters wavelength division demultiplexer 125 from optical fiber 115. Wavelength division deumultiplexer 125 demultiplexes the WDM signal into four single wavelength optical signals 110A–D. Incoming channels 110C and 110D are dropped to outputs 120C and 120D, respectively. Their outgoing counterparts are added from inputs 130C and 130D, respectively. The other two channels 110A and 110B simply pass through OADM 100. As one can see from the figure, the paths traveled by the various channels are fixed.

FIG. 2 is an illustration of another fixed OADM 200 wherein the switching fabric is a combination of circulators and a wavelength grating. As illustrated, three port circulator 250 is coupled to input 210 of OADM 200. Circulator 250 is also coupled to fiber Bragg grating 260 and drop output 220. Three port circulator 270 is also coupled to grating 260 and is coupled to output 240 and add input 230.

OADM 200 works in the following way. A WDM optical signal enters OADM 200 through input 210. The optical signal passes through circulator 250 and encounters grating 260. Grating 260 reflects a desired wavelength signal back to circulator 250 and passes the other wavelengths of the optical signal to circulator 270. The reflected signal is directed to drop output 220 by circulator 250. The remainder of the optical signal that was passed to circulator 270 is directed to output 240. However, an optical signal of the wavelength that was dropped can also be added to the remainder of the optical signal at circulator 270. Such a signal enters OADM 200 through add input 230. This signal then enters circulator 270, reflects off grating 260 and is combined with the remainder of the original optical signal. This new optical signal is then sent to output 240.

In addition to the two devices described above, an OADM can also be based on a crossbar switch. There are a number of devices and techniques that can implement (or attempt to implement) the basic switching of a crossbar. For example, various groups are attempting to develop optical crossbar switches based on MEMS (e.g., micro-mechanical mirrors), BUBBLES, liquid crystal (mirrors), $LiNO_3$, or thermal optic switches. However, each of these devices has a loss associated with it when performing the switching function. This aspect of these devices makes their use less attractive in OADMs, particularly since switching may be cascaded in larger crossbars, thus compounding the overall loss through the crossbar. In addition, many of these approaches also suffer from other disadvantages, such as slow switching speed, large size, requiring complicated electronics, excessive intersymbol crosstalk and/or excessive crosstalk between different channels (e.g., WDM channels).

SUMMARY OF THE INVENTION

An optical add drop multiplexer (OADM) includes a switching fabric comprised of vertical lasing semiconductor optical amplifiers (VLSOAs) for optically switching optical signals from a plurality of pass inputs to a plurality of pass outputs. The OADM receives a wavelength division multiplexed (WDM) optical signal. The WDM optical signal is demultiplexed into a plurality of optical signals. Each optical signal can be passed through to the OADM's pass outputs and/or can be dropped to a drop output. In addition, optical signals can be added from add inputs and switched to the pass outputs of the OADM.

In one embodiment, the switching fabric of the OADM is comprised of a plurality of pass-through paths and a plurality of add paths and drop paths. The pass-through paths are coupled to the drop paths by an optical coupler which splits the optical signal so that it propagates on both the drop path and the pass-through path. A VLSOA couples the optical coupler to the drop path and is turned on when the optical signal needs to be dropped to the drop path. Otherwise, the VLSOA is turned off to prevent the optical signal from interfering with other optical signals propagating on the drop path. The VLSOA not only performs the switching of the optical signals but can also be used to amplify the optical signals to make up for the losses introduced by the optical couplers and other losses.

Similarly, the add paths are coupled to the pass-through paths by an optical coupler. A VLSOA couples the optical coupler to the add path and is turned on when the optical signal needs to be added from the add path to the pass-through path. Otherwise, the VLSOA is turned off to prevent the optical signal from interfering with an optical signal propagating on the pass through path. The VLSOA not only performs the switching of the optical signals but can also be used to amplify the optical signals to make up for the losses introduced by the optical coupler and other losses.

VLSOAs are also positioned on the pass-through path after coupling to the drop paths and before the coupling with the add paths. The VLSOAs are used to block optical signals from propagating on the pass-through path when they are dropped to a drop path or when an optical signal is being added from an add path. If the optical signal is to continue propagating on the pass-through path, the VLSOA is turned on and amplifies the optical signal to make up for losses introduced by optical couplers and other losses.

Using VLSOAs to perform the switching of the optical signals in the OADM has many advantages. Since the VLSOAs can amplify the optical signals in addition to performing the switching function, the losses introduced from splitting the optical signals can be countered thus producing a loss-less OADM switch. In addition, the electronics used to turn the VLSOAs on and off is relatively straightforward and the VLSOAs can be switched quickly so that the overall OADM can be reconfigured quickly. Another advantage of the VLOSA is that they have good crosstalk performance when amplifying WDM optical signals. This allows the OADM to be configured to drop and add multiple channel optical signals with the same overall switch architecture.

In another embodiment of the invention, VLSOAs are used to amplify a WDM optical signal before it is input into an OADM. When the OADM demultiplexes the optical signal into a plurality of optical signals and switches the optical signals to various outputs, the optical signals lose some of their power. The VLSOA can be used to amplify the optical signals prior to being input into the OADM so that the optical signals will withstand the losses introduced in the OADM. Similarly, the loss introduced by the switching in the OADM can also be counteracted by placing a VLSOA at the output of the OADM.

In another embodiment of the invention, VLSOAs are placed on the pass outputs of the switching fabric of the OADM. The VLSOAs are used to balance the power of the optical signals before they are combined into a wavelength division multiplexed optical signal by a wavelength division multiplexer. The VLSOAs can also be coupled to a microprocessor which can be used to control the amount of gain provided by each VLSOA. This allows the VLSOAs to amplify weaker optical signals more than stronger optical signals so that the power levels of the optical signals can be balanced before they are multiplexed together. VLSOAs can also be placed on the pass inputs, drop outputs and/or add inputs to balance the optical signals entering or exiting the OADM switching fabric at these inputs and outputs. These VLSOAs can also be coupled to a microprocessor, which controls the amplification provided by each VLSOA.

BRIEF DESCRIPTION OF THE DRAWING

FIG. 2 (prior art) is an illustration of another fixed OADM 200 based on circulators and a wavelength grating.

FIG. 3 is an illustration of a reconfigurable OADM 300 according to the invention.

FIG. 4 is an illustration of another reconfigurable OADM 400 according to the invention.

FIGS. 5A–C are block diagrams of a portion of the switching fabric that can be used in OADMs 300 and 400.

DETAILED DESCRIPTION OF THE PREFERRED EMBODIMENTS

Figure 1:
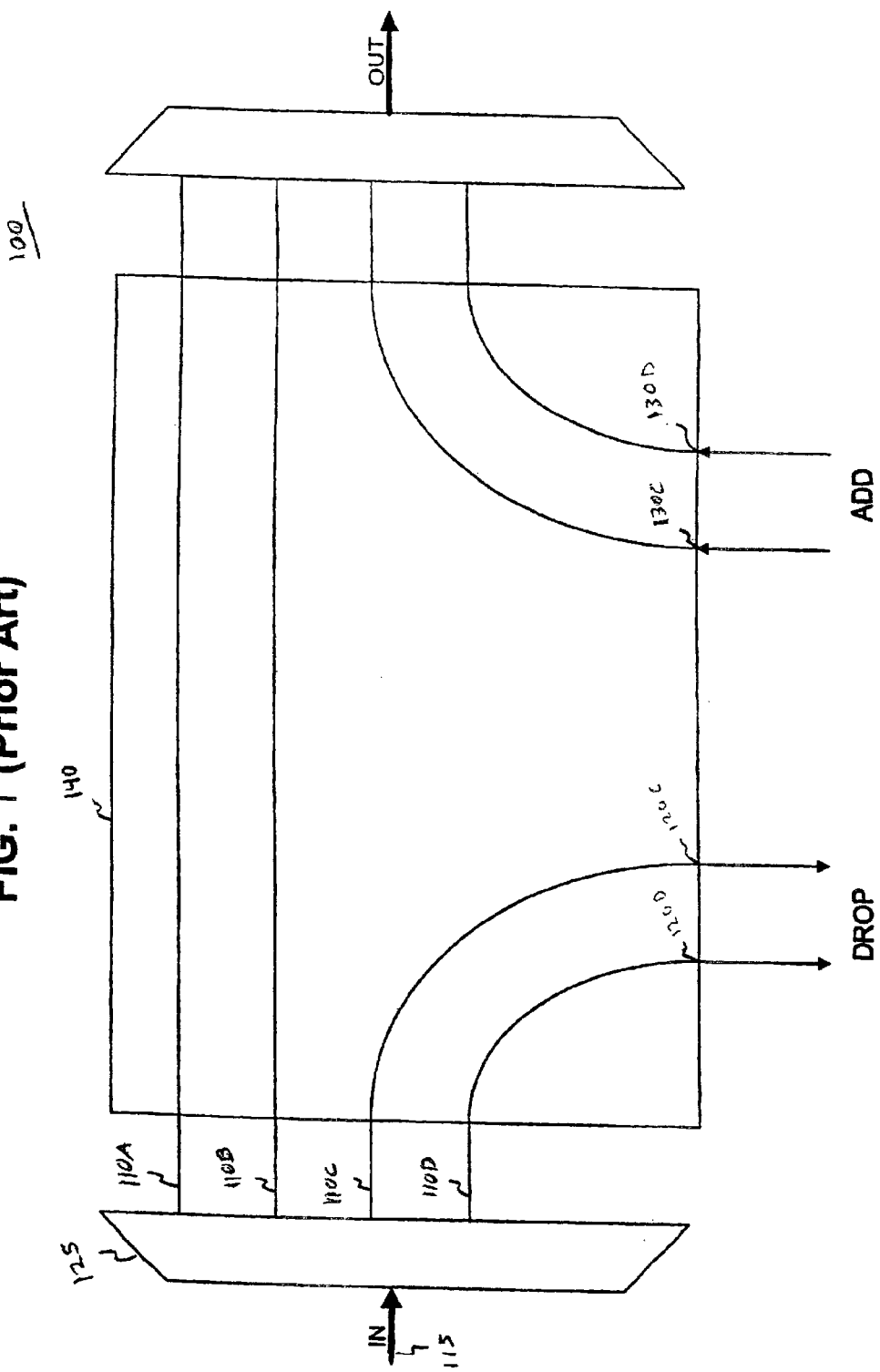
FIG. 1 (prior art) is an illustration of a fixed OADM 100.

FIG. 3 is an illustration of a reconfigurable OADM 300 according to the present invention. OADM 300 comprises a switching fabric 390, which includes two pass inputs 330A–B and two pass outputs 360A–B. OADM 300 also includes two add inputs 350A–B and two drop outputs 340A–B for a total of four inputs and four outputs to switching fabric 390. Switching fabric 390 comprises four switching nodes 315A–D that perform the add, drop and pass-through functionality for OADM 300. In this embodiment, the nodes 315 are arranged in a two-dimensional matrix where the rows of the matrix are defined by input/output pairs 330A/360A and 330B/360B, and the columns of the matrix are defined by add/drop pairs 340A/350A and 340B/350B. One node 315 is located at each row/column junction of the matrix.

In this example, OADM 300 has one input that receives a WDM optical signal 310 carrying two channels (i.e. two optical signals with different wavelengths). Optical signal 310 passes into wavelength division demultiplexer 320. Wavelength division demultiplexer 320 demultiplexes the signal into two channels each with a different wavelength and inputs them into switching fabric 390 through pass inputs 330A and 330B. In this example, each of the channels input at pass input 330A–B can be dropped to either of the drop outputs 340A or 340B. In addition, either of the add inputs 350A or 350B can be used to add channels to either of the pass outputs 360A or 360B. On the output side, the two optical channels leaving switching fabric 390 are combined by wavelength division multiplexer 370 into a single WDM optical signal 380.

Although FIG. 3 and the accompanying text describe an OADM 300 with two pass inputs, two pass outputs, two drop outputs and two add inputs, the principles illustrated can be straightforwardly extended to OADM switching fabrics with varying numbers of pass inputs, pass outputs, add inputs and drop outputs. For example, FIG. 4 is an illustration of another embodiment of the invention, OADM 400, which has a switching fabric 490 comprising N pass inputs 410A–N and N pass outputs 420A–N. This configuration also has N add inputs 460A–N and N drop outputs 470A–N. In addition, there is a switching node 315 at each intersection of a pass input with an add/drop pair. Other configurations, including those in which the number of pass inputs, pass outputs, add inputs and/or drop outputs differ from each other, will be apparent to one skilled in the arts.

In addition, the principles illustrated in FIG. 3 can be straightforwardly extended to OADMs with switching fabrics that provide different switching functionality. For example, in OADM 300 in FIG. 3, each incoming channel input to the pass inputs 330 may be dropped to either drop output 340. Similarly, each optical signal input to add input 350 may be added to either pass output 360. Other embodiments may utilize a different switching functionality. For example, in an alternate embodiment, each pass input 330 and pass output 360 maybe limited to a corresponding drop output 340 and add input 350 (or subset of drop outputs and add inputs). For example, the "A" inputs/outputs may be dedicated to a first wavelength so that, for example, the pass input 330A may only be dropped to drop output 340A and not to drop output 340B. Similarly, the add input 350A may be limited to pass output 360A. As another example, the OADM switching fabric may only be partially reconfigurable, meaning that some of the inputs and outputs may be hardwired to each other while the remaining inputs and outputs are reconfigurable (either with full crossbar functionality or a subset of full crossbar functionality).

As a final example, the switching fabric 390 can also have architectures other than the two-dimensional matrix architecture shown in FIGS. 3 and 4. Examples of other architectures include Banyan and Clos architectures.

Referring again to FIG. 3, the switching nodes 315 typically will include some sort of splitting and switching of optical signals which, if implemented passively, typically will result in a loss to the optical signal. The result is that optical signals leaving OADM 300 will be weaker than the optical signals entering OADM 300. However, vertical lasing semiconductor optical amplifiers (VLSOA), as described herein, which have linear gain characteristics can be used to implement the switching functionality in the various nodes of an OADM, resulting in a lossless OADM switch. Using a VLSOA does not avoid the loss that results from implementation of the switching function (e.g., resulting from redirecting, splitting, coupling, and combining). However, the VLSOA can be used to amplify the optical signal, unlike passive switching components. This will compensate for the losses otherwise introduced.

Constructing an OADM from VLSOAs has further advantages. VLSOAs can be switched quickly so that the overall OADM can be reconfigured quickly. In addition, the electronics required to switch the VLSOAs are relatively simple. In essence, the electronics need only differentiate between turning on the VLSOA (i.e., pumping the VLSOA sufficiently above its laser threshold) and turning off the VLSOA. VLSOAs, because of their gain-clamping characteristics, also have good crosstalk performance. This is important when the OADM adds/drops a WDM optical signal as opposed to single wavelength signals. It is more difficult to construct an OADM 300 from conventional non-lasing SOAs because conventional SOAs have poor intersymbol interference and also poor crosstalk between WDM channels, thus limiting the usefulness of any OADM based on conventional SOAs.

FIG. 5A is an illustration of a portion of the switching fabric of an OADM according to one embodiment of the invention. The broken line-box 315 illustrates a single node in the switching fabric according to FIGS. 3 and 4. The embodiment illustrated in FIG. 5A comprises a drop path 910, an add path 920, and two pass-through paths 930A–B (one of which goes through node 315 and one of which is external to node 315). The pass-through paths 930 couple the pass inputs of the switching fabric to their corresponding pass outputs. Each add path is coupled to a corresponding add input of the switching fabric and each drop path is coupled to a corresponding drop output of the switching fabric. In one embodiment of the invention, the paths are waveguides. However, one skilled in the art will recognize that other embodiments for the paths are possible. For example, the paths could be optical fibers or free space. In addition, a plurality of VLSOAs 500 are coupled to these paths to perform the switching required to pass optical signals to the appropriate outputs.

VLSOA 500A is coupled between pass-through path 930B and drop path 910. A fiber coupler 950A splits the optical signal propagating on pass-through path 930B. A fiber coupler 950A is an optical component that splits the optical signal into two (or more) different paths. Optical couplers other than fiber couplers may also be used. Part of the optical signal is input to VLSOA 500A and part is split to VLSOA 500B. In this embodiment, the power is split 50-50 between VLSOAs 500A and 500B, although different splitting ratios may be used in different designs.

If the optical signal needs to be dropped to the drop path 910 so that it can be output from one of the drop outputs of the OADM, VLSOA 500A will be turned on and will pass the optical signal to drop path 910. Fiber coupler 950B is used to couple the output of VLSOA 500A to drop path 910. VLSOA 500A preferably also amplifies the optical signal as it propagates through the active region, as described herein, to make up for the loss introduced by fiber coupler 950A and other losses. In an alternate embodiment illustrated in FIG. 5B, VLSOA 500I can be positioned on drop path 910 to make up for the losses introduced by fiber coupler 950B and other losses. When the optical signal is dropped to drop path 910, VLSOA 500B can be turned off to block the optical signal from propagating further on pass-through path 930B. In other cases, such as broadcasting, VLSOA 500B can be turned on.

By contrast, when the optical signal is not dropped to drop path 910, VLSOA 500B is turned on so that the optical signal continues to propagate on pass-through path 930B. VLSOA 500B also amplifies the optical signal as it propagates through the active region to make up for the loss introduced by fiber coupler 950A. In addition, VLSOA 500A is turned off so that the optical signal does not propagate on drop path 910 where it might interfere with another optical signal that has been dropped from another node onto drop path 910.

When an optical signal needs to be output to one of the pass outputs from one of the add inputs to the switching fabric, the optical signal is input on one of the add paths. In this example, suppose an optical signal is input to add path 920 that needs to be added to pass-through path 930B. Fiber coupler 950C will split part of the optical signal to VLSOA 500C and the remaining portion of the optical signal will continue to propagate on add path 920. When the optical signal is added to pass-through path 930B, VLSOA 500B can be turned off to block any optical signal currently propagating on pass-through path 930B. VLSOA 500C is turned on so that the optical signal split from add path 920 can pass onto pass-through path 930B. Fiber coupler 950D couples the output of VLSOA 500C to pass-through path 930B. In addition to switching the optical signal, VLSOA 500C can amplify the optical signal to make up for loss.

When an optical signal propagating on add path 920 is not to be added to pass-through path 930B, VLSOA 500C is turned off to block the portion of the optical signal split off from add path 920 by fiber coupler 950C. However, VLSOA 500B is turned on to allow the optical signal currently propagating on pass-through path 930B to continue on pass-through path 930B.

Figure 5B:
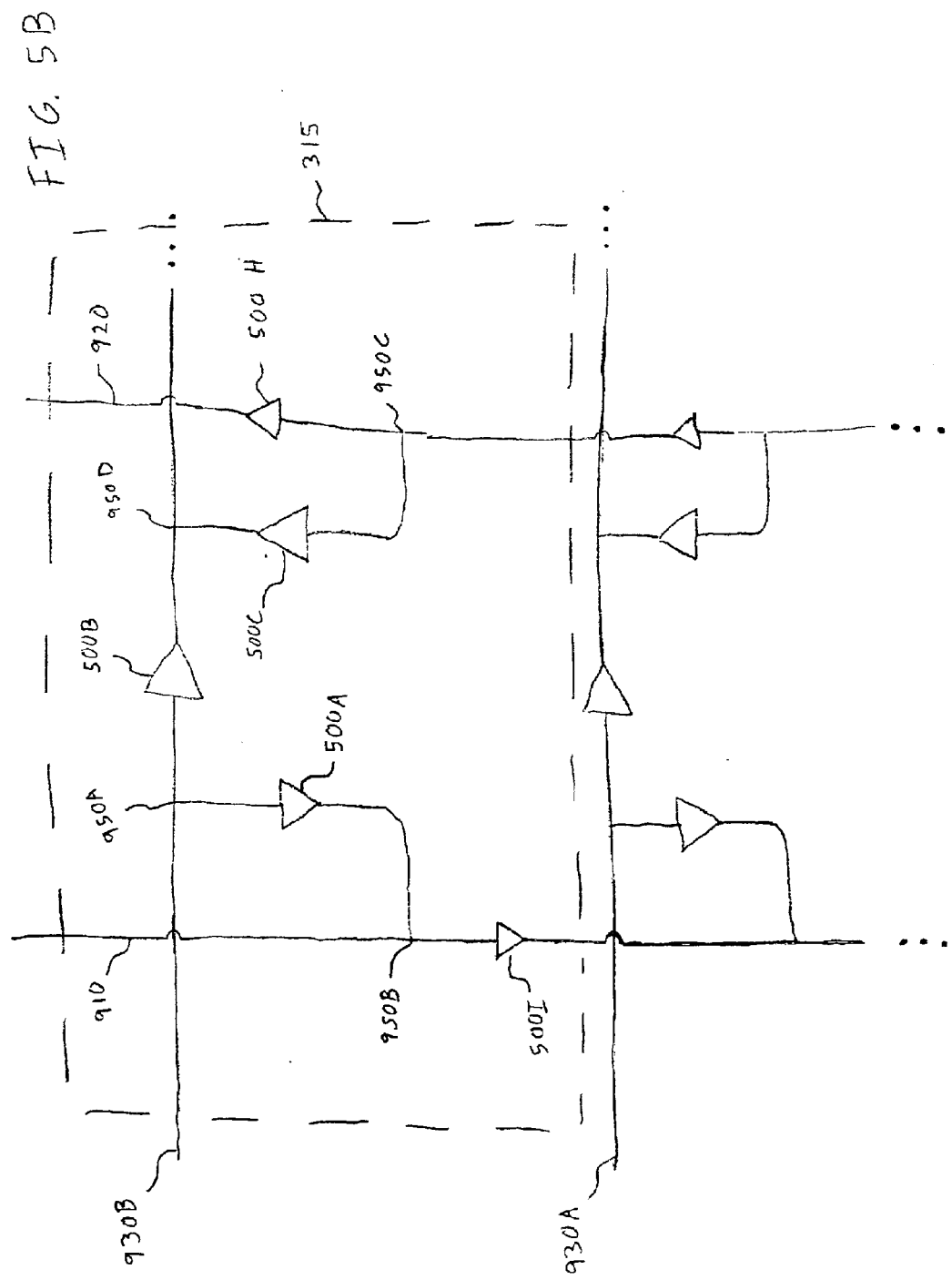

As one can see from the FIG. 5A, half the power of the optical signal propagating on add path 920 is split off by each fiber coupler encountered at each pass-through path 930. If there are a large number of pass-through paths 930, the optical signal propagating on add path 920 may become too weak to use reliably. An alternate embodiment, illustrated, in FIG. 5B, counters this problem by positioning VLSOA 500H on add path 920 to make up for the loss introduced by fiber coupler 950C and other losses.

Alternately, the fiber couplers 950C could implement splitting ratios other than 50-50. For example, if there were ten pass-through paths 930, the fiber couplers 950C could be designed so that each VLSOA 500C receives 10% of the power of the optical signal originally input onto add path 920. Thus, the first fiber coupler 950C would tap 10% of the power, leaving 90% to propagate further down add path 920. The second fiber coupler 950C would tap 11% of the power (11% of 90%=10%), etc. Such an approach may also result in better noise performance. Similar remarks apply to tapping power from the pass-through paths 930.

The embodiment in FIG. 5A also illustrates VLSOA 500G coupled to add path 920 and drop path 910 using fiber couplers 950E and 950F, respectively. VLSOA 500G provides a loopback function that allows an optical signal input on add path 920 to be output directly to drop path 910. When this is desirable, VLSOA 500G is turned on to amplify and pass the optical signal from add path 920 to drop path 910. This aspect of the embodiment illustrated in FIG. 5A is optional. In another embodiment, VLSOA 500G is removed but add path 920 is still coupled to drop path 910. This embodiment can also be used to provide the loopback function.

Another embodiment of the switching fabric that can be used in an OADM is illustrated in FIG. 5C. Once again, the functionality of this embodiment will be described using broken-line box 315 which represents a single node from the OADMs illustrated in FIGS. 3 and 4. In this embodiment, there are two pass-through paths, 930B and 930B2 in each node 315. Pass-through path 930B couples one of the pass inputs of the OADM switching fabric to one of the pass outputs of the switching fabric. Pass-through path 930B carries the optical signal input to the pass input and can either pass the optical signal to the corresponding pass output or can drop the optical signal on one of the drop paths 910 to one of the drop outputs of the switching fabric. As illustrated, pass-through path 930B is coupled to drop path 910 through VLSOA 500A. This part of the embodiment is similar to that in FIG. 5A and works in a similar way.

The difference in this embodiment is that the add paths 920 are coupled to a second pass-through path 930B2. This pass-through path does not couple to a switching fabric pass input or pass output. Pass-through path 930B2 is used to carry an optical signal that needs to eventually be added to pass-through path 930B. As illustrated in broken-line box 315, add path 920 is coupled to pass-through path 930B2 through VLSOA 500C. In essence, adding an optical signal to pass-through path 930B2 is similar to adding an optical signal to pass-through path 930B in FIG. 5A. However, also note that pass-through path 930B2 is coupled to pass-through path 930B using VLSOA 500E (outside of broken-line box 315). Preferably, this is done just before pass-through path 930B is coupled to its corresponding pass output of the switching fabric. When VLSOA 500E is turned on, the optical signal that is output to the pass output of the switching fabric is the optical signal that was added to pass-through path 930B2 through one of the add paths 920. When VLSOA 500E is turned off, the optical signal that is output to the pass output of the switching fabric is the optical signal input on pass-through path 930B at the switching fabric pass input.

The advantage of this embodiment is that it allows an optical signal to be added from one of the add paths prior to dropping the optical signal from pass-through path 930B, which was input from the pass input of the switching fabric, to one of the drop paths. For example, referring to FIG. 3, this embodiment of the switching fabric allows an optical signal to be added at add input 350A, that is eventually output from the switching fabric 390 at pass output 360A while at the same time allowing the optical signal input at pass input 330A to be dropped to drop output 340B. In the previous embodiments, this was more difficult because the optical signal added at add input 350A would have been combined with the optical signal input from pass input 330A. As a result, both optical signals would be dropped and passed through the switching fabric of the OADM.

In another embodiment of the invention, the switching fabric of the OADM can be implemented as a full crossbar switch in which each pass input and add input of the switching fabric can be mapped to any of the pass outputs and/or drop outputs. An example of the crossbar switch can be found in copending patent application Ser. No. 10/020, 527, entitled "Optical Crossbar Using Lasing Semiconductor Optical Amplifiers," by Jeffrey D. Walker and Sol P. DiJaili, filed Dec. 15, 2001, which is herein incorporated by reference.

As one skilled in the art will recognize, the configurations described above for the switching fabric can be scaled to function for any number of pass inputs, drop outputs, add inputs and pass outputs. In addition, one skilled in the art will recognize that this switching fabric allows an optical signal from any of the pass inputs to be output to any of the drop or pass outputs. Similarly, this configuration allows any optical signal input on the add input to be output to any of the pass outputs. One skilled in the art will also recognize that the amplification provided by each of the VLSOAs in the switching fabric can be adjusted depending on the strength of the optical signal it is amplifying.

In an alternative embodiment of the OADM illustrated in FIGS. 3 and 4, demultiplexer 320 is configured to demultiplex the incoming WDM optical signal into a plurality of WDM optical signals each having one or more optical channels (i.e. wavelengths). These WDM optical signals can be added, dropped or passed-through by the switching fabric of the OADM in the same manner as the single wavelength optical signals described above. As described herein, VLSOAs 500 can amplify WDM optical signals with substantially less crosstalk than non-lasing SOAs due to the gain clamped characteristics of the VLSOA. Thus, VLSOAs 500 can still be used to perform the switching of the WDM optical signals in this embodiment of the invention.

Figure 6:
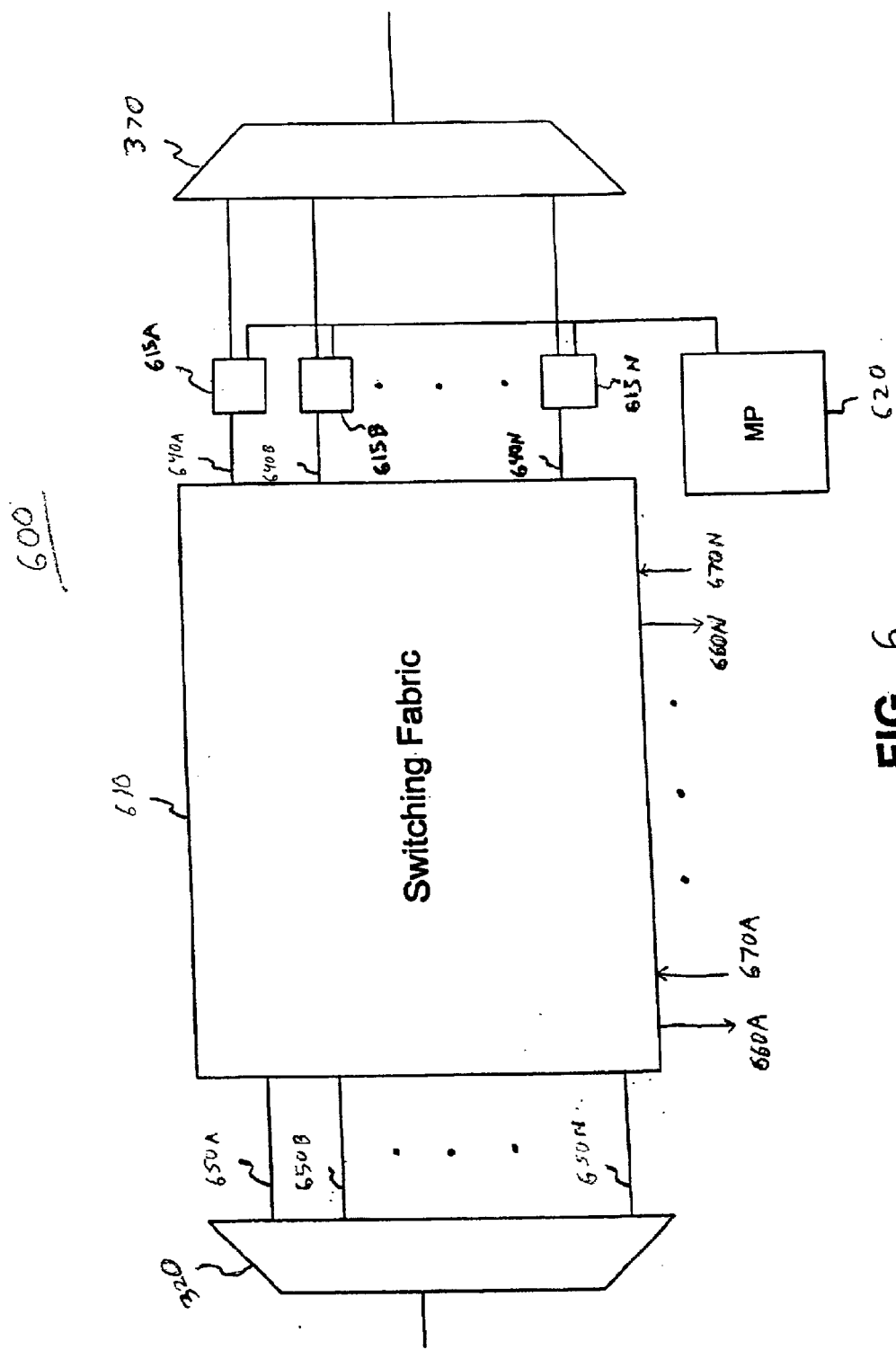
FIG. 6 is block diagram of VLSOAs 615 on the outputs of switching fabric 610 to balance the power of the optical signals output of switching fabric 610.

FIG. 6 is a block diagram of another embodiment of the invention. In this embodiment, VLSOAs 615A–N are coupled to the pass outputs of switching fabric 610 in OADM 600. The outputs of VLSOAs 615A–N are then coupled to wavelength division multiplexer 370. VLSOAs 615 are also coupled to microprocessor 620. It should be noted that the switching fabric 610 of OADM 600 in this embodiment can be any conventional optical switching fabric or one of the switching fabrics of the present invention.

Due to the reconfigurable nature of OADM 600, the optical channels output from the pass outputs 640A–N of switching fabric 610 may have come from pass inputs 650A–N or from add inputs 670A–N of switching fabric 610. Since these signals may have come from different sources and may have traveled unrelated distances and paths to reach OADM 600 (and even traveled different paths through OADM 600), it is possible that some of the optical signals output from the pass outputs 640A–N of switching fabric 610 will have different power levels and signal strengths. By placing VLSOAs 615A–N on the path of optical channels output from pass outputs 640A–N, VLSOAs 615 can balance the signal strength of the optical signals by amplify each optical signal to ensure that they all have the same power prior to being passed into wavelength division multiplexer 370. Microprocessor 620 is coupled to each VLSOA 615A–N so that it can supply a control signal to the VLSOAs 615A–N. For example, microprocessor 620 can selectively adjust the amplification provided by each VLSOA 615 in order to achieve the desired output signal strength. In one embodiment, the VLSOAs 615A–N are implemented as a monolithic array of VLSOAs, as opposed to discrete devices.

Although the embodiment described above in FIG. 6 refers to placing VLSOAs 615A–N on the pass outputs of switching fabric 610, balancing the optical signals at other locations can be also be achieved using VLSOAs 615. For example, VLSOAs 615 could also be placed on the drop outputs 660A–N, the add inputs 670A–N and/or the pass inputs 650A–N to amplify and balance the optical signals on these inputs/outputs. Similarly, a microprocessor 620 could also be coupled to these VLSOAs to control the amplification provided by each VLSOA 615. For OADM's which use VLSOAs as part of the switching fabric 610, the amplification provided by these VLSOAs can also be adjusted in order to balance the power in the optical signals.

Figure 7:
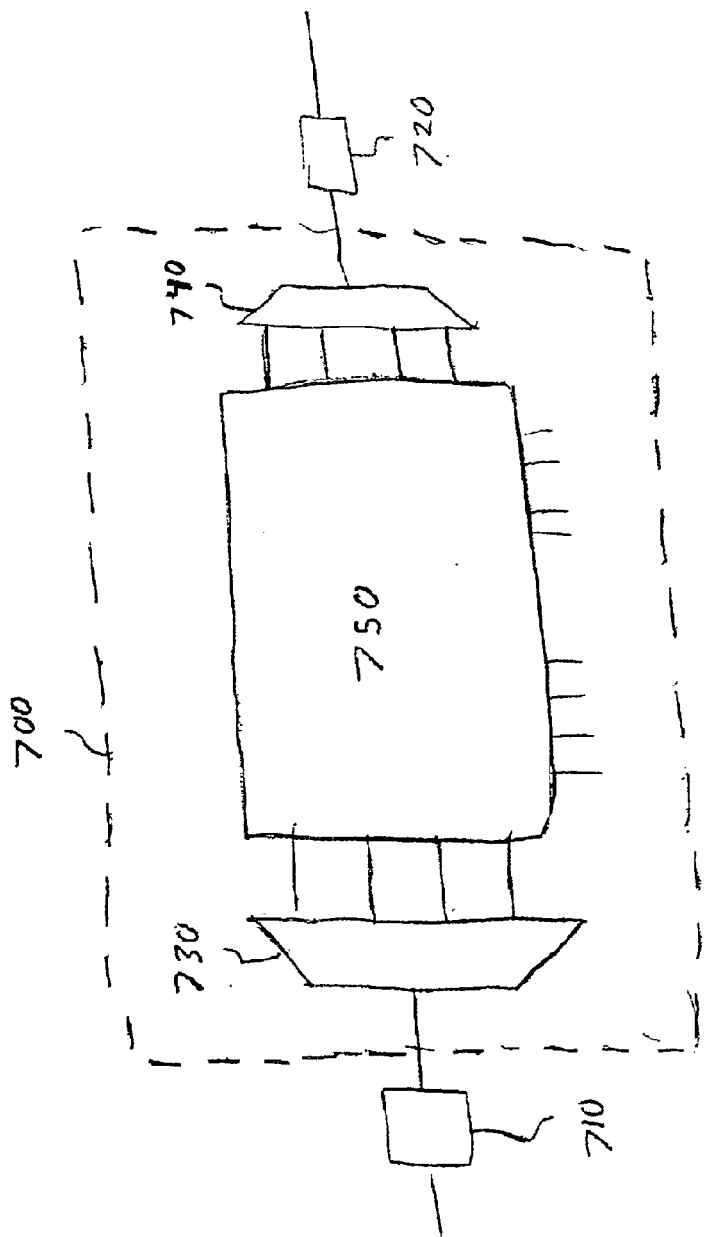
FIG. 7 is a block diagram of OADM 700 with VLSOAs 710 and 720 located on the inputs and outputs, respectively, of OADM 700.

Another embodiment of the invention is illustrated in FIG. 7. In this embodiment, VLSOAs 710 and 720 are placed on the input and the output of OADM 700 respectively. The demultiplexer 730, multiplexer 740 and the switching fabric 750 of the OADM introduce loss into the individual channels of the WDM optical signal as they are being switched to the correct output. Unlike the present invention, most OADMs do not have mechanisms in place to make up for these losses. As a result, the optical signals that are output from conventional OADMs are often very weak. By placing VLSOA 720 on the output of OADM 700, all of the channels of the WDM optical signal output from OADM 700 can be amplified simultaneously. In addition, if the WDM optical signal is weak before entering OADM 700 (due to dispersion, etc.) the losses introduced by OADM 700 may degrade the optical signal to the point where the optical signal is no longer useable. Amplifying the WDM optical signal in VLSOA 710 before it is input into OADM 700 helps to counteract this problem.

It should be noted that the switching fabric 750 of OADM 700 in this embodiment can be any conventional optical switching fabric or the switching fabric of the present invention. In addition, VLSOAs could also be placed on the add inputs or the drop outputs to amplify the optical signals being added or dropped to counteract the same problems described above.

Figure 8:
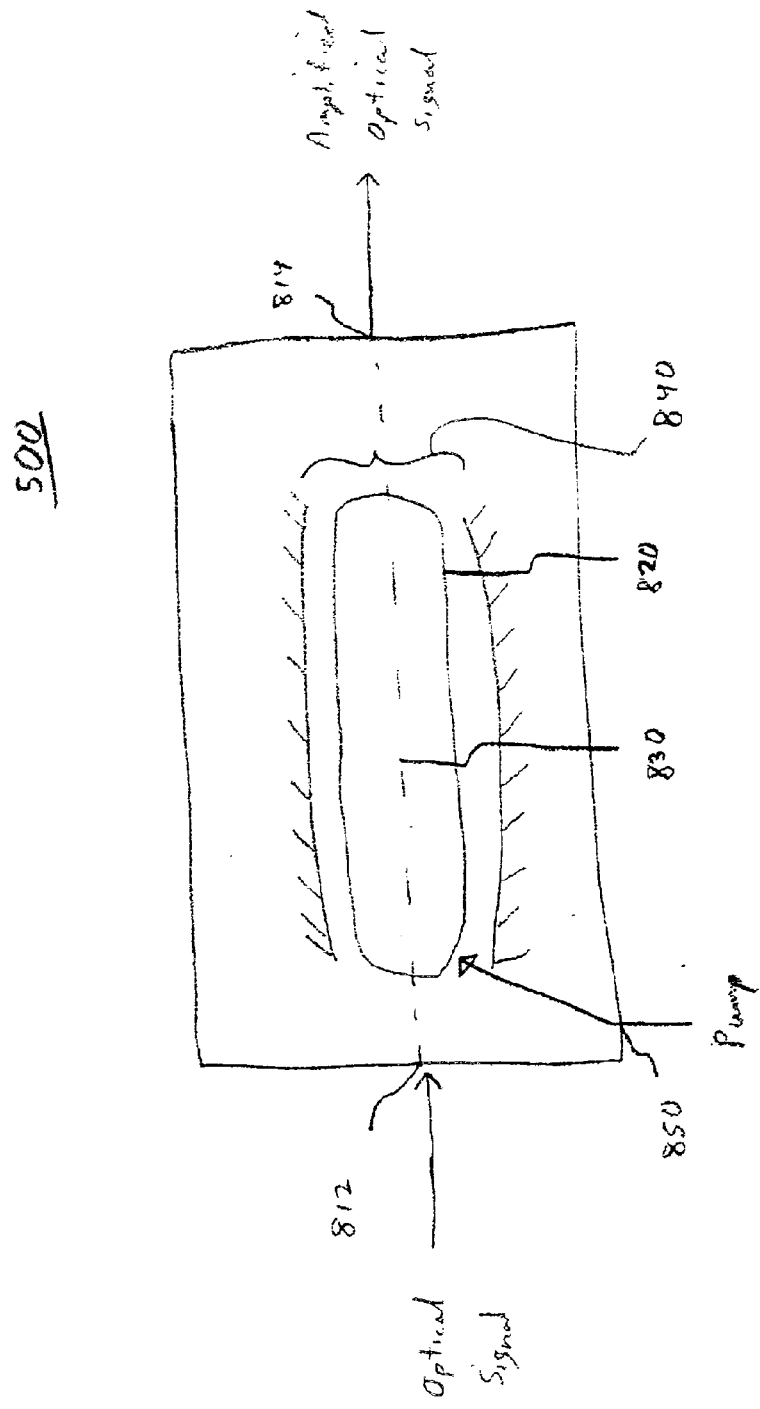
FIG. 8 is a diagram of a vertical lasing semiconductor optical amplifier (VLSOA) 500 suitable for the present invention.

FIG. 8 is a diagram of a vertical lasing semiconductor optical amplifier (VLSOA) 500 suitable for the present invention. The VLSOA 500 has an input 812 and an output 814. The VLSOA 500 further includes a semiconductor gain medium 820, with an amplifying path 830 coupled between the input 812 and the output 814 of the VLSOA 500 and traveling through the semiconductor gain medium 820. The VLSOA 500 further includes a laser cavity 840 including the semiconductor gain medium 820, and a pump input 850 coupled to the semiconductor gain medium 820. The laser cavity 840 is oriented vertically with respect to the amplifying path 830. The pump input 850 is for receiving a pump to pump the semiconductor gain medium 820 above a lasing threshold for the laser cavity 840.

Figure 9:
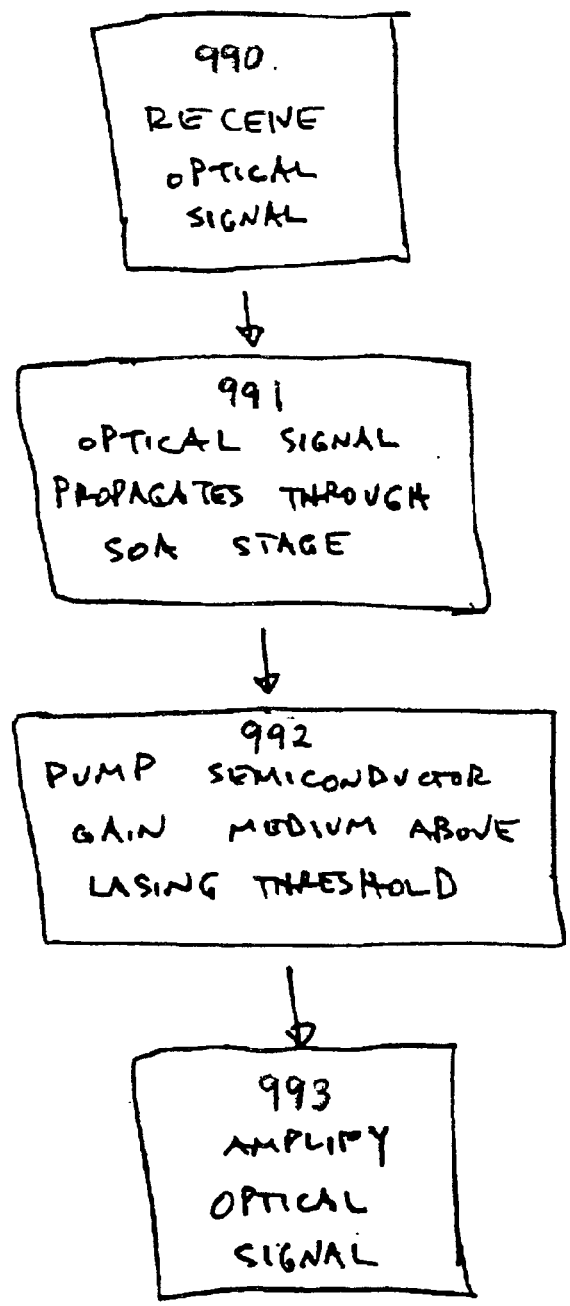
FIG. 9 is a flow diagram illustrating operation of VLSOA 500.

FIG. 9 is a flow diagram illustrating operation of VLSOA 500 when it is used as an amplifier. The VLSOA 500 receives 990 an optical signal at its input 812. The optical signal propagates 991 along the amplifying path 830. The pump received at pump input 850 pumps 992 the semiconductor gain medium above a lasing threshold for the laser cavity 840. When lasing occurs, the round-trip gain offsets the round-trip losses for the laser cavity 840. In other words, the gain of the semiconductor gain medium 820 is clamped to the gain value necessary to offset the round-trip losses. The optical signal is amplified 993 according to this gain value as it propagates along the amplifying path 830 (i.e., through the semiconductor gain medium 820). The amplified signal exits the VLSOA 500 via the output 814.

Note that the gain experienced by the optical signal as it propagates through VLSOA 500 is determined in part by the gain value of the semiconductor gain medium 820 (it is also determined, for example, by the length of the amplifying path 830) and this gain value, in turn, is determined primarily by the lasing threshold for the laser cavity 840. In particular, the gain experienced by the optical signal as it propagates through each VLSOA 500 is substantially independent of the amplitude of the optical signal. This is in direct contrast to the situation with non-lasing SOAs and overcomes the distortion and crosstalk disadvantages typical of non-lasing SOAs.

Figure 10A:
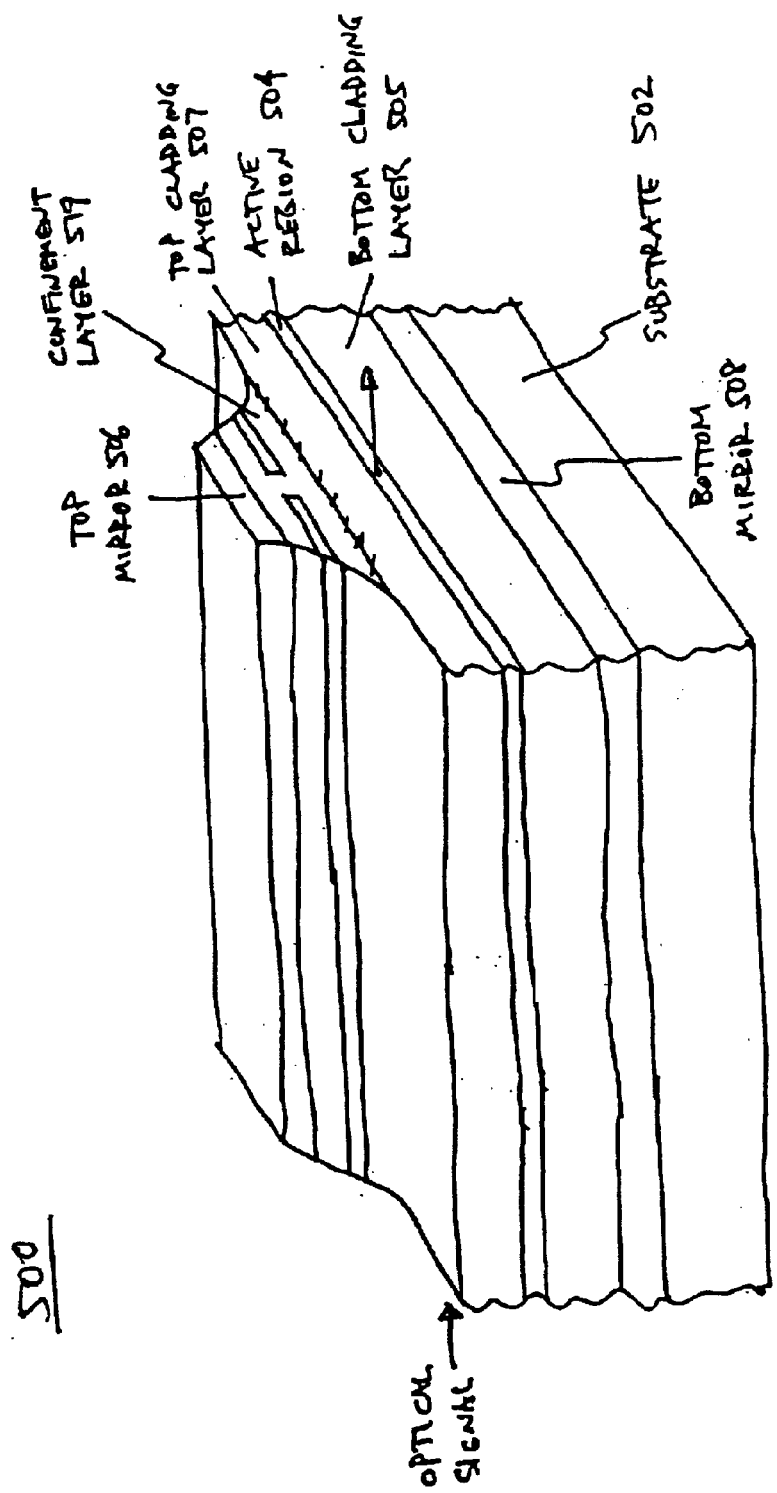
FIGS. 10A–C are a perspective view, transverse cross-sectional view, and a longitudinal cross-sectional view of one embodiment of a vertically lasing semiconductor optical amplifier (VLSOA) 500.
Figure 10B:
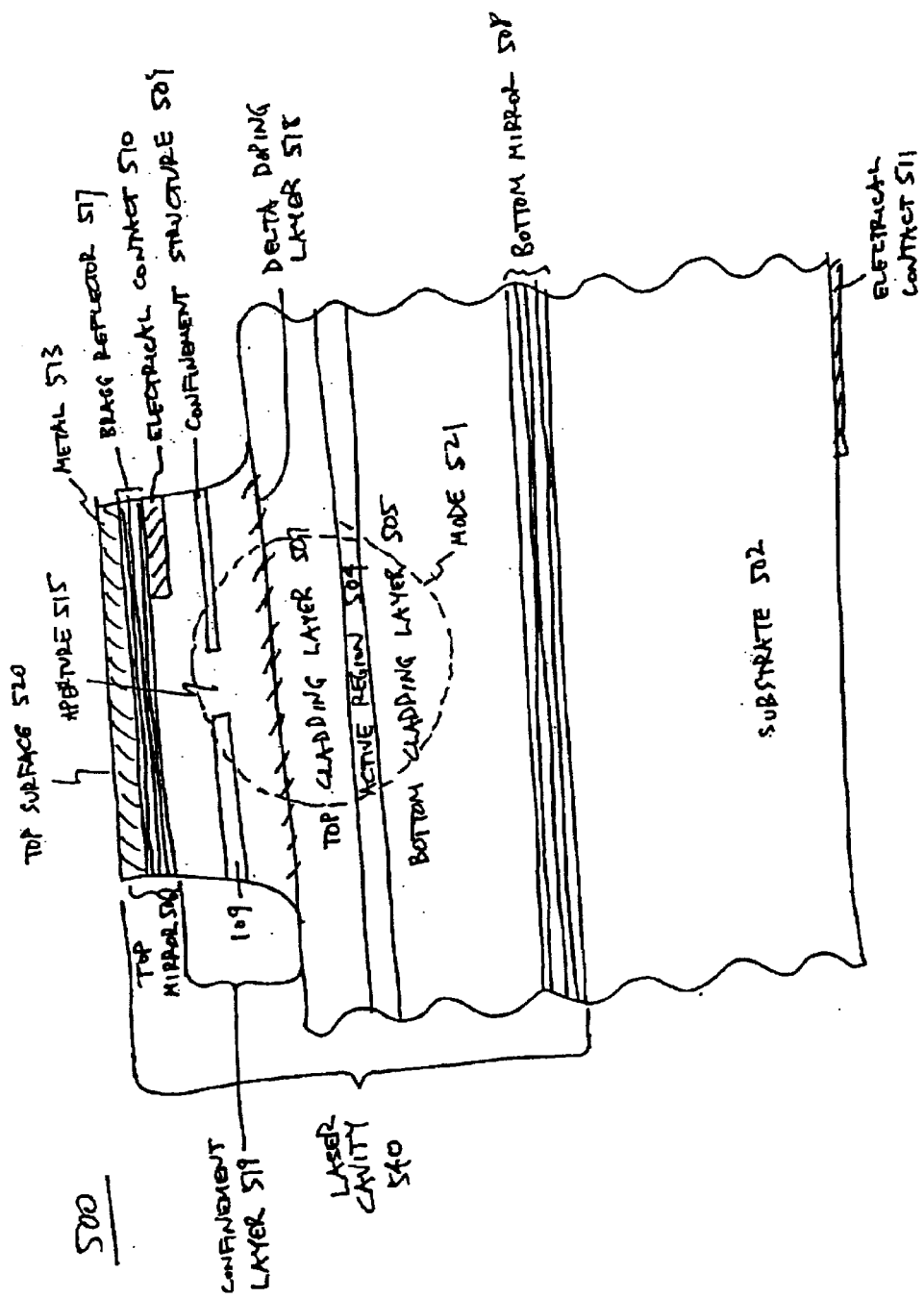
Figure 10C:
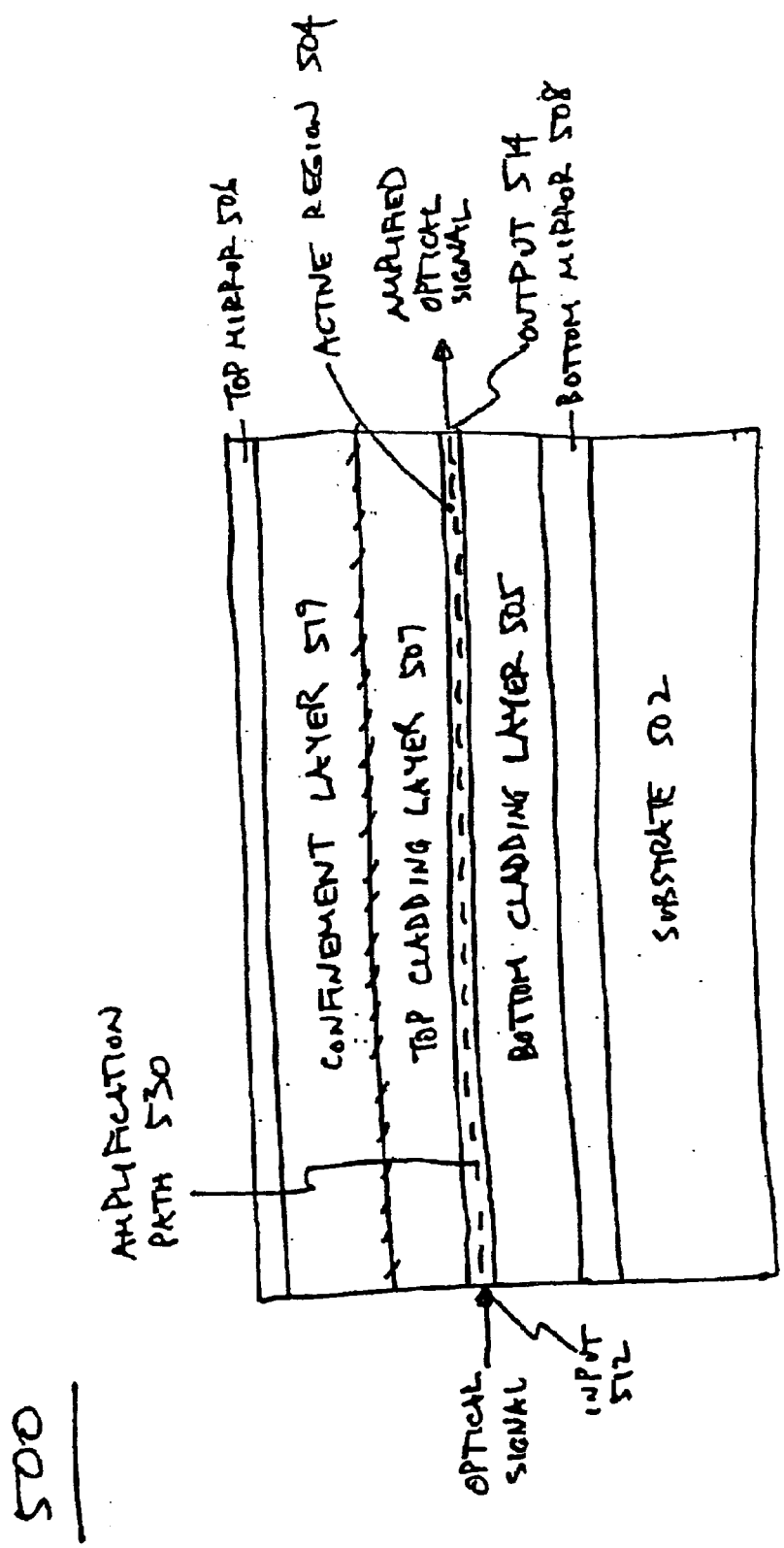

FIGS. 10A–10C are a perspective view, transverse cross-section, and longitudinal cross-section, respectively, of one embodiment of VLSOA 500 according to the present invention, with FIG. 10B showing the most detail.

Referring to FIG. 10B and working from bottom to top in the vertical direction (i.e., working away from the substrate 502), VLSOA 500 includes a bottom mirror 508, bottom cladding layer 505, active region 504, top cladding layer 507, confinement layer 519, and a top mirror 506. The bottom cladding layer 505, active region 504, top cladding layer 507, and confinement layer 519 are in electrical contact with each other and may be in direct physical contact as well. An optional delta doping layer 518 is located between the top cladding layer 507 and confinement layer 519. The confinement layer 519 includes a confinement structure 509, which forms aperture 515. The VLSOA 500 also includes an electrical contact 510 located above the confinement structure 509, and a second electrical contact 511 formed on the bottom side of substrate 502.

VLSOA 500 is a vertical lasing semiconductor optical amplifier since the laser cavity 540 is a vertical laser cavity. That is, it is oriented vertically with respect to the amplifying path 530 and substrate 502. The VLSOA 500 preferably is long in the longitudinal direction, allowing for a long amplifying path 530 and, therefore, more amplification. The entire VLSOA 500 is an integral structure formed on a single substrate 502 and may be integrated with other optical elements. In most cases, optical elements which are coupled directly to VLSOA 500 will be coupled to the amplifying path 530 within the VLSOA. Depending on the manner of integration, the optical input 512 and output 514 may not exist as a distinct structure or facet but may simply be the boundary between the VLSOA 500 and other optical elements. Furthermore, although this disclosure discusses the VLSOA 500 primarily as a single device, the teachings herein apply equally to arrays of devices.

VLSOA 500 is a layered structure, allowing the VLSOA 500 to be fabricated using standard semiconductor fabrication techniques, preferably including organo-metallic vapor phase epitaxy (OMVPE) or organometallic chemical vapor deposition (OMCVD). Other common fabrication techniques include molecular beam epitaxy (MBE), liquid phase epitaxy (LPE), photolithography, e-beam evaporation, sputter deposition, wet and dry etching, wafer bonding, ion implantation, wet oxidation, and rapid thermal annealing, among others.

The optical signal amplified by the VLSOA 500 is confined in the vertical direction by index differences between bottom cladding 505, active region 504, and top cladding 507, and to a lesser extent by index differences between the substrate 502, bottom mirror 508, confinement layer 519, and top mirror 506. Specifically, active region 504 has the higher index and therefore acts as a waveguide core with respect to cladding layers 505,507. The optical signal is confined in the transverse direction by index differences between the confinement structure 509 and the resulting aperture 515. Specifically, aperture 515 has a higher index of refraction than confinement structure 509. As a result, the mode of the optical signal to be amplified is generally concentrated in dashed region 521. The amplifying path 530 is through the active region 504 in the direction in/out of the plane of the paper with respect to FIG. 10B.

The choice of materials system will depend in part on the wavelength of the optical signal to be amplified, which in turn will depend on the application. Wavelengths in the approximately 1.3–1.7 micron region are currently preferred for telecommunications applications, due to the spectral properties of optical fibers. The approximately 1.28–1.35 micron region is currently also preferred for data communications over single mode fiber, with the approximately 0.8–1.1 micron region being an alternate wavelength region. The term "optical" is meant to include all of these wavelength regions. In one embodiment, the VLSOA 500 is optimized for the 1.55 micron window.

In one embodiment, the active region 504 includes a multiple quantum well (MQW) active region. MQW structures include several quantum wells and quantum wells have the advantage of enabling the formation of lasers with relatively low threshold currents. In alternate embodiments, the active region 504 may instead be based on a single quantum well or a double-heterostructure active region. The active region 504 may be based on various materials systems, including for example InAlGaAs on InP substrates, InAlGaAs on GaAs, InGaAsP on InP, GaInNAs on GaAs, InGaAs on ternary substrates, and GaAsSb on GaAs. Nitride material systems are also suitable. The materials for bottom and top cladding layers 505 and 507 will depend in part on the composition of active region 504.

Examples of top and bottom mirrors 506 and 508 include Bragg reflectors and non-Bragg reflectors such as metallic mirrors. Bottom mirror 508 in FIG. 10 is shown as a Bragg reflector. Top mirror 506 is depicted as a hybrid mirror, consisting of a Bragg reflector 517 followed by a metallic mirror 513. Bragg reflectors may be fabricated using various materials systems, including for example, alternating layers of GaAs and AlAs, $SiO_2$ and $TiO_2$, InAlGaAs and InAlAs, InGaAsP and InP, AlGaAsSb and AlAsSb or GaAs and AlGaAs. Gold is one material suitable for metallic mirrors. The electrical contacts 510, 511 are metals that form an ohmic contact with the semiconductor material. Commonly used metals include titanium, platinum, nickel, germanium, gold, palladium, and aluminum.

In this embodiment, the laser cavity is electrically pumped by injecting a pump current via the electrical contacts 510, 511 into the active region 504. In particular, contact 510 is a p-type contact to inject holes into active region 504, and contact 511 is an n-type contact to inject electrons into active region 504. Contact 510 is located above the semiconductor structure (i.e., above confinement layer 519 and the semiconductor part of Bragg reflector 517, if any) and below the dielectric part of Bragg reflector 517, if any. For simplicity, in FIG. 10, contact 510 is shown located between the confinement layer 519 and Bragg reflector 517, which would be the case if Bragg reflector 517 were entirely dielectric. VLSOA 500 may have a number of isolated electrical contacts 510 to allow for independent pumping within the amplifier. This is advantageous because VLSOA 500 is long in the longitudinal direction and independent pumping allows, for example, different voltages to be maintained at different points along the VLSOA. Alternately, the contacts 510 may be doped to have a finite resistance or may be separated by finite resistances, rather than electrically isolated.

Confinement structure 509 is formed by wet oxidizing the confinement layer 519. The confinement structure 509 has a lower index of refraction than aperture 515. Hence, the effective cross-sectional size of laser cavity 540 is determined in part by aperture 515. In other words, the confinement structure 509 provides lateral confinement of the optical mode of laser cavity 540. In this embodiment, the confinement structure 509 also has a lower conductivity than aperture 515. Thus, pump current injected through electrical contact 510 will be channeled through aperture 515, increasing the spatial overlap with optical signal 521. In other words, the confinement structure 509 also provides electrical confinement of the pump current. Other confinement techniques may also be used, including those based on ion implantation, impurity induced disordering, ridge waveguides, buried tunnel junctions, and buried heterostructures.

The above description is included to illustrate various embodiments of the present invention and is not meant to limit the scope of the invention. From the above description, many variations will be apparent to one skilled in art that would be encompassed by the spirit and scope of the invention. The scope of the invention is to be limited only by the following claims.

What is claimed is:

1. An optical add-drop multiplexer comprising:
    a wavelength division demultiplexer for receiving a wavelength division multiplexed (WDM) optical signal and splitting the WDM optical signal into a plurality of optical signals;
    a switching fabric coupled to the wavelength division demultiplexer for switching the plurality of optical signals from a plurality of inputs to a plurality of outputs using vertical lasing semiconductor optical amplifiers (VLSOA) as switches to add, drop or pass-through the plurality of optical signals; and
    a wavelength division multiplexer coupled to at least two of the plurality of outputs for multiplexing optical signals output from the at least two of the plurality of outputs into an output WDM optical signal.

2. An optical add-drop multiplexer as defined in claim 1, further comprising a plurality of control signals to control whether each VLSOA used as a switch is turned on or off by the plurality of control signals.

3. An optical add-drop multiplexer as defined in claim 2, wherein each VLSOA that is on passes and amplifies an optical signal and wherein each VLSOA that is off blocks an optical signal.

4. An optical add-drop multiplexer as defined in claim 1, the switching fabric further comprising:
    a plurality of pass-through paths;
    a plurality of add paths; and
    a plurality of drop paths.

5. An optical add-drop multiplexer as defined in claim 4, the switching fabric further comprising a plurality of fiber couplers to connect the pass-through paths with the add paths and to connect the drop paths with the pass-through paths.

6. An optical add-drop multiplexer comprising:
    a demultiplexer for receiving a wavelength division multiplexed (WDM) signal for splitting the WDM signal into a plurality of optical signals;
    a switching fabric coupled to the demultiplexer; and
    a plurality of nodes in the switching fabric, each node comprising:
        at least one pass-through path, a drop path, and an add path, wherein the pass-through paths of the plurality of nodes connect pass inputs of the switching fabric to corresponding pass outputs of the switching fabric; and
        a plurality of vertical lasing semiconductor optical amplifiers (VLSOAs) that can separately be turned on or off to perform at least one of:
            switch an optical signal from a pass-through path to a drop path;
            switch the optical signal from an add path to the pass-through path; and
            switch the optical signal from the add path to the drop path.

7. An optical add-drop multiplexer as defined in claim 6, each node further comprising a plurality of fiber couplers configured to form a first optical path from the pass-through path to the drop path and form a second optical path from the add path to the pass-through path.

8. An optical add-drop multiplexer as defined in claim 7, wherein the first optical path includes one of the plurality of VLSOAs disposed therein that is turned on to pass an optical signal from the pass-through path to the drop path or off to block an optical signal from passing to the pass-through path from the drop path.

9. An optical add-drop multiplexer as defined in claim 7, wherein the second optical path includes one of the plurality or VLSOAs disposed therein that is turned on to pans an optical signal from the add path to the pass-through path or off to block an optical signal from passing from the add path to the pass-through path.

10. An optical add-drop multiplexer as defined in claim 7, wherein the plurality of fiber couplers split an optical signal into a first signal having a first percentage of optical power and a second signal having a second percentage of optical power.

11. An optical add-drop multiplexer as defined in claim 6, wherein the plurality of VLSOAs amplify an optical signal when on and block the optical signal when off.

12. An optical add-drop multiplexer as defined in claim 6, further comprising a multiplexer to combine the plurality of optical signals back to the WDM signal.

13. An optical add-drop multiplexer as defined in claim 6, further comprising a loopback optical path from the add path to the drop path, the loopback path including a VLSOA that is off to block an optical signal from passing to the drop path from the add or on to pass tho optical signal to the drop path from the add path.

14. An optical add-drop multiplexer comprising:
    a switching fabric;
    a plurality of nodes in the switching fabric, each node comprising:
        a pass-through path;
        an add path;
        a drop path;
        a first optical path connecting the pass-through path to the drop path using fiber couplers, the first optical path including a first vertical lasing semiconductor optical amplifier (VLSOA);
        a second optical path connecting the add path to the pass-through path using fiber couplers, the second optical path including a second VLSOA;
        a third VLSOA disposed in the pass-through path; and
        control signals for turning the first, second and third VLSOA on or off.

15. An optical add-drop multiplexer as defined in claim 14, wherein the control signals turn the third VLSOA off and the first VLSOA on to pass an optical signal from the pass-through path to the drop path.

16. At optical add-drop multiplexer as defined in claim 14, wherein the control signals turn the third VLSOA on and the first VLSOA off to pass an optical signal through a particular node on the pass-through path.

17. An optical add-drop multiplexer as defined in claim 14, wherein the control signals turn the third VLSOA off and the second VLSOA on to pass an optical signal from the add path to the pass-through path.

18. An optical add-drop multiplexer as defined in claim 14, each node further comprising a plurality of fiber couplers configured to connect the first optical path to the pass-through path and the drop path and connect the second optical path to the add path and the pass-through path.

19. An optical add-drop multiplexer as defined in claim 18, each fiber coupler configured to split an optical signal into a first signal having a first optical power and a second signal having a second optical power.

20. An optical add-drop multiplexer as defined in claim 14, wherein at least one of the first, second, and third VLSOAs amplify an optical signal passing through a particular node.

21. An optical add-drop multiplexer as defined in claim 14, further comprising a demultiplexer that separates a WDM signal into separate optical signals, each optical signal delivered to a pass-through path.

22. An optical add-drop multiplexer as defined in claim 21, further comprising a multiplexer to combine the separate optical signals from the pass-through paths into the WDM signal.

23. An optical add-drop multiplexer comprising:

a demultiplexer for receiving a wavelength division multiplexed (WDM) optical signal and splitting the WDM optical signal into a plurality of optical signals;

a switching fabric coupled to the wavelength division demultiplexer for switching the plurality of optical signals from a plurality of inputs to a plurality of outputs; and a vertical lasing semiconductor optical amplifier (VLSOA) connected to each of the plurality of outputs and that are separately controlled to balance the plurality of optical signals that are combined into an output WDM optical signal by a multiplexer.

24. An optical add-drop multiplexer as defined in claim 23, wherein the switching fabric further comprises a plurality of VLSOAs, wherein by selectively turning the plurality of VLSOAs on or off, the plurality of optical signals call be added, dropped, or passed through the add-drop multiplexer.

25. An optical add-drop multiplexer as defined in claim 23, wherein the switching fabric further comprises a plurality of nodes, each node comprising;

at least one pass-through path that is connected with at least one of the plurality of inputs and with at least one of the plurality of outputs;

an add path; and a drop path.

26. An optical add-drop multiplexer as defined in claim 25, wherein the switching fabric further comprises a plurality of fiber couplers used to form (i) a first optical path between the add path and the at least one pass-through path that is controlled by a VLSOA and (ii) a second optical path between the drop path and the at least one pass-through path that is controlled by a VLSOA.

27. An optical add-drop multiplexer as defined in claim 25, further comprising a microprocessor that controls each VLSOA connected to each of the plurality of output.

* * * * *

UNITED STATES PATENT AND TRADEMARK OFFICE
CERTIFICATE OF CORRECTION

| | | |
|---|---|---|
| PATENT NO. | : 6,829,405 B1 | Page 1 of 1 |
| APPLICATION NO. | : 10/095539 | |
| DATED | : December 7, 2004 | |
| INVENTOR(S) | : Wachsman et al. | |

It is certified that error appears in the above-identified patent and that said Letters Patent is hereby corrected as shown below:

on title page
Item 56, OTHER PUBLICATIONS, Line 5, before "unnumbered" change "i" to --1--
Page 2, Left column, Line 35, change "18" to --1–8--
Page 2, Left column, Line 61, change "09" to --'97--

Column 5
Line 34, change "arts" to --art--
Line 67, change "(VLSOA)" to --(VLSOAs)--

Column 9
Line 45, change "amplify" to --amplifying--

Column 12
Line 16, change "InA1GaAs" to --InAlGaAs--

Column 14
Line 16, before "VLSOAs" change "or" to --of--
Line 16, change "pans" to --pass--
Line 35, change "tho" to --the--

Signed and Sealed this

Fifteenth Day of August, 2006

JON W. DUDAS
*Director of the United States Patent and Trademark Office*